(12) United States Patent
Privitera et al.

(10) Patent No.: US 11,653,198 B2
(45) Date of Patent: May 16, 2023

(54) METHODS FOR LOCATION-BASED IDENTIFICATION BLURRING

(71) Applicant: Cuebiq S.R.L., Milan (IT)

(72) Inventors: Filippo Privitera, Milan (IT); Danilo Giuffrida, Misterbianco (IT); Emanueldomenico Sangregorio, Milan (IT); Francesco Guglielmino, Miami, FL (US); Shane Wiley, Cathedral City, CA (US); Zachary David Cohen, Ridgewood, NJ (US); Antonio Tomarchio, New York, NY (US); Giulio Bider, Sedriano (IT); William Nespoli, New York, NY (US); Marco Funaro, Milan (IT); Giovanni Cassarini, Milan (IT)

(73) Assignee: Cuebiq S.R.L.

( * ) Notice: Subject to any disclaimer, the term of this patent is extended or adjusted under 35 U.S.C. 154(b) by 70 days.

(21) Appl. No.: 17/361,595

(22) Filed: Jun. 29, 2021

(65) Prior Publication Data

US 2022/0417738 A1    Dec. 29, 2022

(51) Int. Cl.
*H04W 12/02* (2009.01)
*H04L 9/40* (2022.01)
*H04W 12/63* (2021.01)

(52) U.S. Cl.
CPC ........... *H04W 12/02* (2013.01); *H04L 63/107* (2013.01); *H04W 12/63* (2021.01)

(58) Field of Classification Search
CPC ...... H04W 12/02; H04W 12/63; H04L 63/107
USPC ........................................................ 455/411
See application file for complete search history.

(56) References Cited

U.S. PATENT DOCUMENTS

| | | | |
|---|---|---|---|
| 8,458,349 B2 | 6/2013 | Brunell et al. | |
| 9,319,876 B2 | 4/2016 | Arunkumar et al. | |
| 9,760,718 B2* | 9/2017 | Braghin | G06F 16/215 |
| 2010/0064373 A1* | 3/2010 | Cai | H04L 63/0421 |
| | | | 726/26 |

(Continued)

FOREIGN PATENT DOCUMENTS

| | | |
|---|---|---|
| EP | 2843585 A1 | 3/2015 |
| WO | 2017187207 A1 | 11/2017 |

OTHER PUBLICATIONS

Bamba et al; "Supporting Anonymous Location Queries in Mobile Environments with PrivacyGrid"; Apr. 2008, 10 pages.

*Primary Examiner* — Joel Ajayi
(74) *Attorney, Agent, or Firm* — Lerner David LLP (57) ABSTRACT

A method and system for blurring location data. Location data indicating a location of a mobile device and a user identification associated with the mobile device is received. Prestored data indicating a plurality of entries is accessed, each entry having a respective stored location associated with a corresponding location status. In response to an entry in the prestored data including a stored location corresponding to the location of the mobile device indicated in the location data, a derived location of the mobile device is generated based on the corresponding location status of the stored location, wherein the derived location is less accurate than the location indicated in the received location data. The derived location of the mobile device is stored in a mobile device location log associated with the received user identification.

16 Claims, 9 Drawing Sheets

(56) References Cited

U.S. PATENT DOCUMENTS

2015/0067881 A1    3/2015   Badstieber et al.
2017/0277767 A1    9/2017   Dang et al.

\* cited by examiner

| User 1 | 67 Maple St. (Home) | Personal Area |
| --- | --- | --- |
| User 1 | 2100 Main St. (Work) | Personal Area |
| User 1 | 30 Orange Rd. | Blacklisted Area |
| User 1 | 2135 Smith St. | Blacklisted Area |
| User 1 | 2235 Main St. | Whitelisted Area |
| User 2 | 8 Olive Ct. (Home) | Personal Area |
| User 2 | 2145 Main St. (Work) | Personal Area |
| User 2 | 44 Michigan Blvd. | Personal Area |
| User 2 | 110 North St. | Whitelisted Area |
| User 2 | 2235 Main St. | Whitelisted Area |
| User 2 | 2280 Smith St. | Whitelisted Area |
| User 3 | 12 Oak Terr. (Home) | Blacklisted Area |
| User 3 | 16 Oak Terr. (Work) | Blacklisted Area |
| User 3 | 330 Livingston Ave. | Blacklisted Area |

FIG. 3A

| | |
|---|---|
| 2050 Main St. (Grocery Store) | Commercial Area |
| 2105 Main St. (Laundromat) | Commercial Area |
| 2175 Main St. (Candy Store) | Commercial Area |
| 2205 Main St. (Hardware Store) | Commercial Area |
| 2000 Smith St. (Shoe Store) | Commercial Area |
| 2100 Smith St. (Grocery Store) | Commercial Area |
| 2510 Smith St. (Restaurant) | Commercial Area |
| 2520 Smith St. (Restaurant) | Commercial Area |
| 20 Orange Rd. (Nail Salon) | Commercial Area |
| 400 Livingston Ave. (Post Office) | Commercial Area |
| 2075 Main St. (Pharmacy) | Blacklisted Area |
| 2805 Main St. (Police Station) | Blacklisted Area |
| 300 Livingston Ave. (Pediatrician) | Blacklisted Area |
| 2 Oak Terr. (Dental Clinic) | Blacklisted Area |

METHODS FOR LOCATION-BASED IDENTIFICATION BLURRING

BACKGROUND

Improvements in telecommunication and data storage systems have given way to abundant storage of mobile device records, including details logs of mobile device locations over time. Storing detailed location information provides several benefits to mobile device end-users and third-party clients, such as providing more personalized service to the mobile device users based on their known current and historical whereabouts. However, it is also becoming increasingly important to protect the privacy of mobile device end-users. Many mobile device end-users wish for their data to remain private, such as maintaining privacy of a mobile device location log. In order to maintain privacy, it may even be preferable to avoid storing detailed location information altogether.

BRIEF SUMMARY

The present disclosure provides a privacy enhanced mobility (PEM) data service capable of managing mobile device users' sensitive data while also collecting useful data that is not private or sensitive. In some instances, the data that is collected can be managed on a user-by-user basis according to personalized preferences or user-specific prestored data. In other instances, data may be managed according to general settings in order to avoid placing the burden on mobile device users to manage their sensitive data. A combination of user-specific and general settings is also provided for in the example systems and methods herein.

One aspect of the present disclosure provides a method including: receiving, by one or more processors, location data indicating a location of a mobile device and a user identification associated with the mobile device; accessing, by the one or more processors, prestored data indicating a plurality of entries, each entry comprising a respective stored location associated with a corresponding location status; in response to an entry in the prestored data including a stored location corresponding to the location of the mobile device indicated in the location data, generating, by the one or more processors, a derived location of the mobile device based on the corresponding location status of the stored location, wherein the derived location is less accurate than the location indicated in the received location data; and storing, by the one or more processors, the derived location of the mobile device in a mobile device location log associated with the received user identification.

In some examples, the method may further include deleting the location indicated in the received location data without storing the location indicated in the received location data in the mobile device location log.

In some examples, the prestored data may include general prestored data, and each entry of the general prestored data may be associated with all mobile devices. The prestored data may further include user-specific prestored data, and each entry of the user-specific prestored data may further include a stored user identification associated with the stored location and the corresponding location status. The method may further include, in response to an entry in the prestored data including a stored location corresponding to the location of the mobile device indicated in the location data and a stored user identification corresponding to the received user identification, generating, by the one or more processors, the derived location of the mobile device based on the corresponding location status of the stored location.

In some examples, the corresponding location status may indicate that the location of the mobile device indicated in the location data is a personal location.

In some examples, the method may further include, in response to an entry in the prestored data including a stored location corresponding to the location of the mobile device indicated in the location data and a blacklist location status, masking, by the one or more processors, the location of the mobile device. Masking the location of the mobile device may include not storing the location of a mobile device and not generating a derived location of the mobile device. Alternatively, masking the location of the mobile device may include generating, by the one or more processors, a null location entry, and storing the null location entry in the mobile device location log as the location of the mobile device.

In some examples, the method may further include, in response to an entry in the prestored data including a stored location corresponding to the location of the mobile device indicated in the location data and a whitelist location status, storing, by the one or more processors, the location of the mobile device indicated in the received location data in the mobile device location log.

In some examples, generating the derived location of the mobile device may include: determining a granularity of the location of the device indicated in the received location data; and up-leveling the location to a coarser granularity, wherein the up-leveled location is the derived location.

In some examples, generating the derived location of the mobile device may include adding noise to the location of the mobile device indicated in the location data, and the noise may displace the location by up to threshold distance. The threshold distance may be about 100 meters.

In some examples, the derived location may be compliant with at least one of the General Data Protection Rules (GDPR) or the California Consumer Privacy Act (CCPA)

Another aspect of the disclosure is directed to a method including: obtaining, by one or more processors, prestored data including a plurality of entries, each entry including a respective stored location associated with a corresponding location status and a corresponding user density value, the user density value indicating a number of mobile devices to have been present in the stored location; receiving, by the one or more processors, location data indicating a location of a first mobile device and a first user identification associated with the first mobile device; accessing, by the one or more processors, the prestored data; in response to an entry in the prestored data including a stored location corresponding to the location of the first mobile device indicated in the location data, generating, by the one or more processors, a derived location of the first mobile device based on the corresponding location status and the corresponding user density value of the stored location, wherein the derived location is less accurate than the location indicated in the received location data; and storing, by the one or more processors, the derived location of the first mobile device in a mobile device location log associated with the first user identification.

In some examples, the method may further include updating the user density value of the stored location in prestored data based on the location data.

In some examples, the user density value may indicate a degree of blurring for generating the derived location, and an increase in the user density value may correlate to a lower degree of blurring for generating the derived location.

In some examples, obtaining the prestored data may include: receiving, by the one or more processors, a plurality of location inputs, each location input indicating a location of a mobile device and a user identification associated with the mobile device; and generating, by the one or more processors, the prestored data based at least in part on the received plurality of location inputs. Alternatively, obtaining the prestored data may include receiving, by the one or more processors, the prestored data from one or more third parties.

A further aspect of the disclosure is directed to a system including one or more processors and a memory storing prestored data indicating a plurality of entries, each entry including a respective stored location associated with a corresponding location status, and instructions. The instructions may be programmed to cause the one or more processors to: receive location data indicating a location of a mobile device and a user identification associated with the mobile device; in response to an entry in the prestored data including a stored location corresponding to the location of the mobile device indicated in the location data, generate a derived location of the mobile device based on the corresponding location status of the stored location, wherein the derived location is less accurate than the location indicated in the received location data; and store the derived location of the mobile device in a mobile device location log associated with the received user identification.

In some examples, the memory may further include the mobile device location log associated with the received user identification.

DETAILED DESCRIPTION

Figure 1:
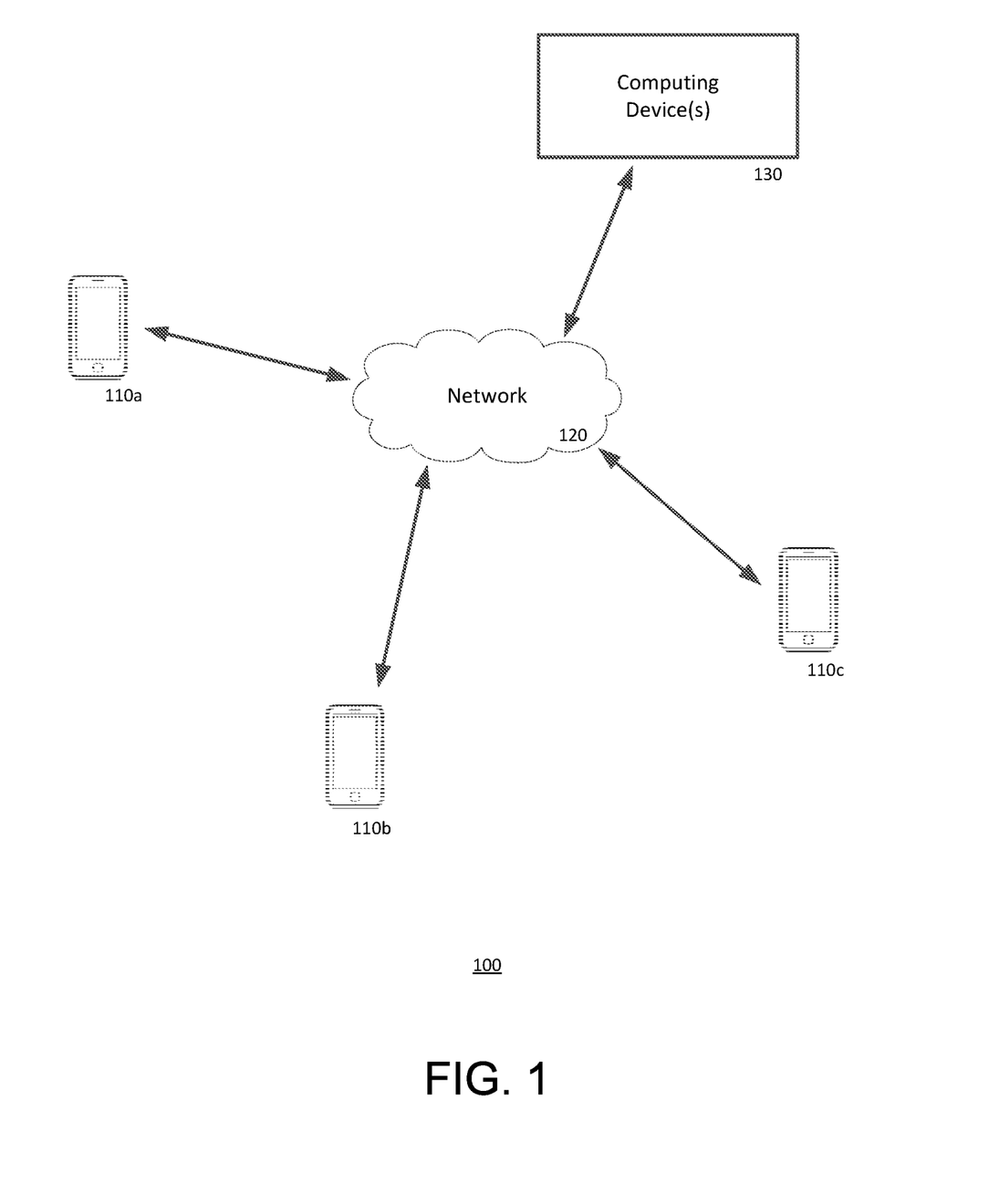
FIG. 1 is a diagram of a system in accordance with an aspect of the disclosure.

FIG. 1 is a diagram of a system 100 for location-based identification blurring. The system 100. The system 100 includes one or more mobile devices 110a, 110b, 110c for which a location can be tracked. For instance, the mobile devices may be any one or combination of devices, including but not limited to smartphones, tablets, global positioning system (GPS) trackers, pagers, and so on. Each of the mobile devices 110a. 110b, 110c is connected by a network 120 to one or more computing devices 130. The computing devices 130 are capable of communicating with the mobile devices 110a, 110b, 110c over the network 120. For instance, a mobile device may determine its location using a built-in location tracking device (e.g., antenna) and then may communicate the determined location to the one or more computing devices 130. In other instances, the determined location may be communicated from a location separate from the mobile device, such as one or more base towers in communication with an antenna of the mobile device. The one or more computing devices 130 may be capable of receiving the tracked location of the mobile device and storing the tracked location therein.

Communications between mobile devices 110a, 110b, 110c and the computing device 130 may be transmitted and received over the network 120 using various configurations and protocols, including but not limited to short range communication protocols such as near-field communication (NFC), Bluetooth™ or Bluetooth™ Low Energy (LE) communications, an intranet connection, an Ethernet connection, a Wi-Fi connection, a local network, an internet connection, HTTP, a virtual private network, a wide area network, other private networks using proprietary communication protocols, or any combination thereof.

Figure 2:
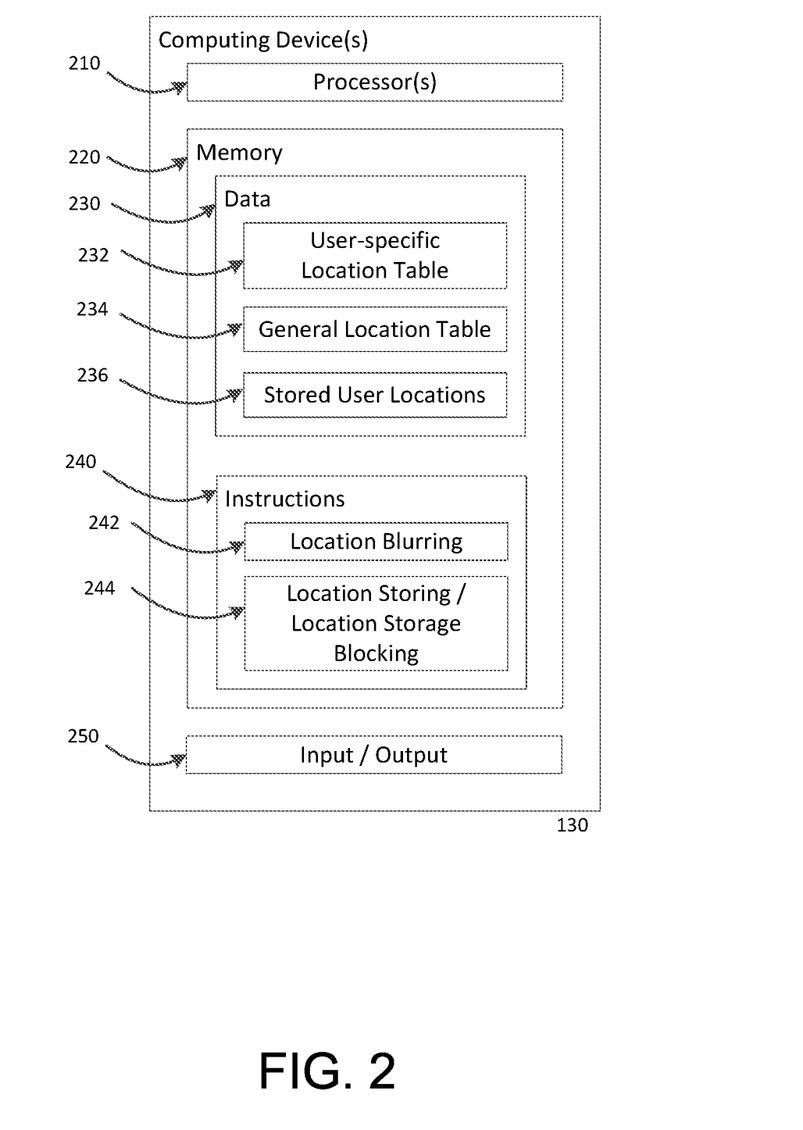
FIG. 2 is a block diagram of an example computing device of the system of FIG. 1.

FIG. 2 is a block diagram of an example computing device 200 that may be used as the computing device 130 of FIG. 1. The computing device 200 may itself include one or more computing devices, each of which may include a processor 210, memory 220, and input/output connections 250 for communication with the mobile devices 110a, 110b, 110c over the network 120.

The processor 210 may be a well-known processor, multiple-distributed processor, or other lesser-known types of processors. Alternatively, the processor 210 can be a dedicated controller such as an ASIC. The memory 220 can store information accessible by the processor 210, including data 230 that can be retrieved, manipulated or stored by the processor 210, in accordance with instructions 240 stored in the memory. The memory 220 may be a type of non-transitory computer readable medium capable of storing information accessible by the processor 210, such as a hard-drive, solid state drive, tape drive, optical storage, memory card, ROM, RAM, DVD, CD-ROM, write-capable, and read-only memories.

Although the system described herein is not limited by a particular data structure, the data 220 may be stored in computer registers, in a data store as a structure having a plurality of different fields and records, or documents, or buffers. The data 220 may also be formatted in a computer-readable format such as, but not limited to, binary values, ASCII or Unicode. Moreover, the data 220 can include information sufficient to identify relevant information, such as numbers, descriptive text, proprietary codes, pointers, references to data stored in other memories, including other network locations, or information that is used by a function to calculate relevant data. The instructions 230 may be a set of instructions executed directly, such as machine code, or indirectly, such as scripts, by the processor 210. In this regard, the terms "instructions," "steps," "programs" and "routines" can be used interchangeably herein.

Although FIG. 2 functionally illustrates the processor 210 and memory 220 as being within a single block, the processor 210 and memory 220 may actually include multiple processors and memories that may or may not be stored within the same physical housing. For example, some of the data 230 and instructions 240 may be stored on a removable storage device such as a CD-ROM. Also, some or all of the instructions and data can be stored remote from the processor 210, but may be accessed remotely, such as over the network 150. Additionally, the processor 210 can actually include a collection of processors, which may or may not operate in parallel.

The data 230 can include various tables and logs, some of which may be editable or manipulable by mobile device end-users, one or more managers of the system, clients of the system, or any combination thereof. For instance, a table may include end-user preference data specific to a given end-user and updatable by the end-user according to the end-user's preferences. In some instances, end-user preference data may be controlled according to a specific user device. In other instances, end-user preference data may be stored for a given end-user, and all mobile devices associated with the end-user may be managed according to the end-user's preference data. Since each end-user may have different preferences and since these preferences may change over time, the end-user preference data may be editable or configurable by the end-user, such as through communication to the computing device from a device or mobile device recognized as belonging to the end-user. In some instances, the end-user preference data may be configurable or updatable without direct control from the end-user, such as based on statistical inference by the one or more processors of the end-user's preferences Other tables and logs may not be editable by end-users, managers, or both. For instance, a location history log including location history of a mobile device may be stored in the computing device but not subject to manipulation by a end-user so that the location history can be a reliable portrayal of the device's past locations and movement. Although the end-user may not be able to manipulate the data stored in the location history log after it is stored, the end-user can maintain some level of control over the information that is stored in the location history log in the first place through the end-user preference settings. Additionally or alternatively, changing the locations stored in the log may be restricted, but end-users may retain permission to manually erase data from the log.

Figure 3A:
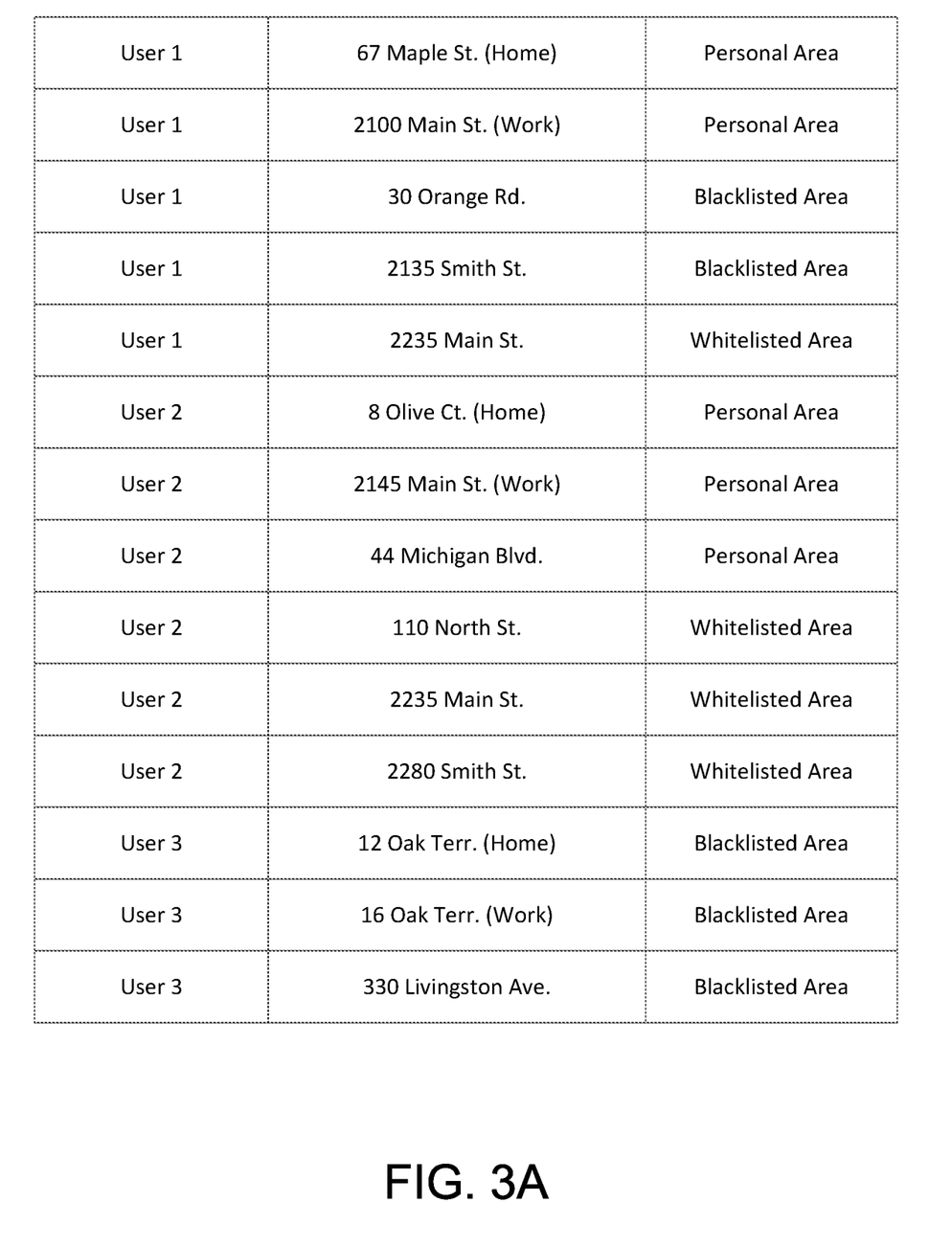
FIG. 3A is an example user-specific location table of the computing device of FIG. 2.

In the example of FIG. 2, the data 230 includes a user-specific location table 232 indicating specific locations associated with corresponding end-users. FIG. 3A illustrates an example user-specific location table containing user-specific location data for three example end-users, User 1, User 2 and User 3. Each entry in the user-specific location table includes at least three items: an end-user identification, a location, and a location setting or status.

The end-user identification may be user-specific or device-specific. For instance, each end-user identification may correspond to a different mobile device, such as mobile device 110*a* corresponding to User 1 and so on, such that user-specific location data is also device-specific. Alternatively, each end-user may correspond to a different person or organization, and a separate table (not shown) may be used to store correspondence information between particular mobile devices and their associated end-users, such that the user-specific location data is generalized for all devices of a given end-user. Combinations or hybrids of these two cases may also be implemented within the computing device. Associations between end-users or end-user devices and the corresponding identifications may be stored in a separate table. For instance, the separate table may associate individual devices with tokens, such that a given end-user can access data for their respective mobile devices but the separate tokens would prevent managers or other entities with access to the stored data from recognizing that records of the respective mobile devices are linked to one another by a common end-user.

Each end-user included in the table is associated with one or more locations. A location may be a geographical location or region. In the example of FIG. 3A, the locations shown are designated according to addresses. However, in other implementation, other location-identifying information may be used, such as geographical coordinates. Furthermore, the granularity of a location may be different in other examples. For instance, a location may be as specific as a section or region of an address, or may be as general as multiple addresses, an entire block, an entire town, and so on. Also, in the example of FIG. 3A, the location information is shown to include further parenthetical information, such as whether a location is an end-user's "Home" or "Work" location. This information is provided for purposes of illustration, and in other examples, the parenthetical information may be optional. In further examples, the parenthetical may be designated as a separate item of the table.

Each location is associated with a particular status. The location status indicates what type of location is listed, and may be further used to control the blurring of the associated location using the techniques described herein. In FIG. 3A, various types of location status listed in the table include "Personal Area," "Blacklisted Area" and "Whitelisted Area." A personal area is an area associated with a given mobile device or person, such as a home or workplace. A blacklisted area is an area in which the end-user wishes to not be tracked. A whitelisted area is an area in which the end-user does wish to be tracked. The location status essentially amounts to a user preference, as it indicates the end-user's preference for being tracked or not being tracked in a given location.

Figure 3B:
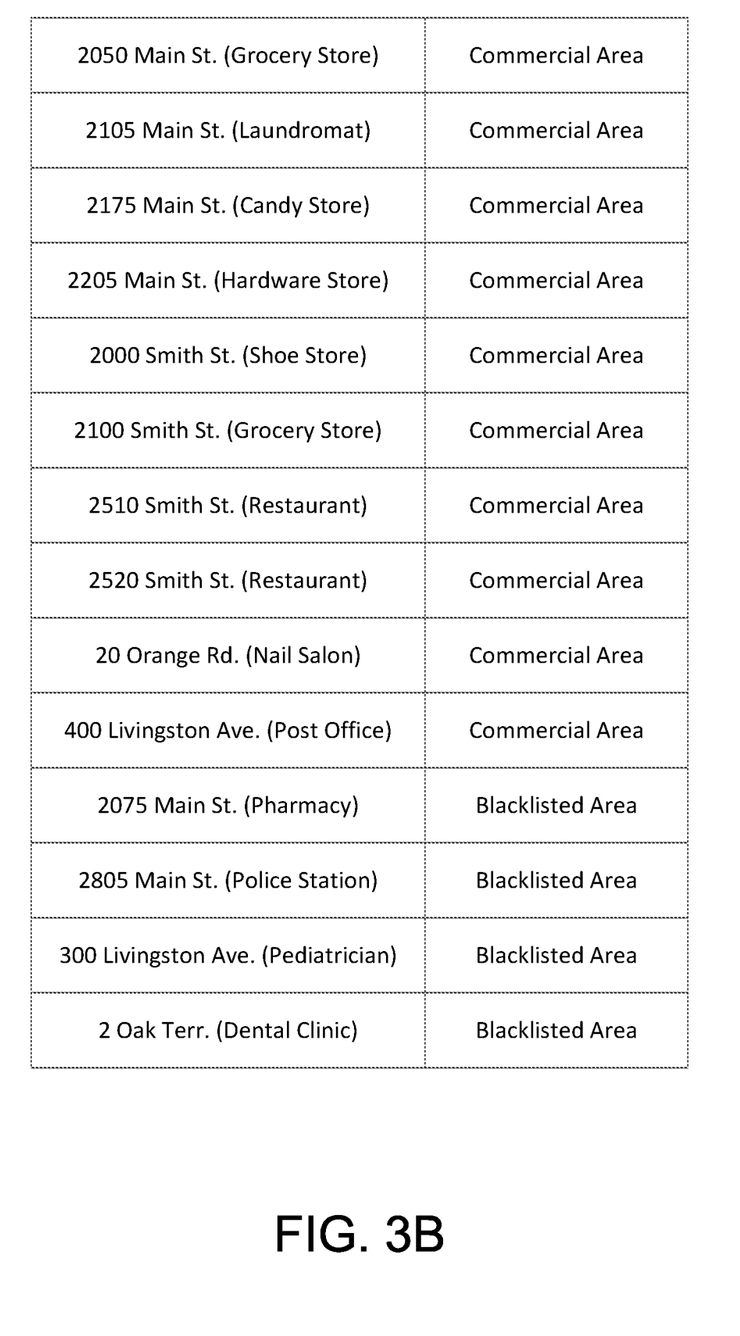
FIG. 3B is an example general location table of the computing device of FIG. 2.

Returning to the example computing device 200 of FIG. 2, the data 230 further includes a general location table 234 indicating specific locations that are not associated with specific end-users but rather are generalized for all end-users. FIG. 3B illustrates an example general location table. Each entry in the general location table includes at least two items: a location, and a corresponding location status. The location and location status of FIG. 3B are comparable to the location and location status entries described in connection with FIG. 3A. The difference is that each location is not associated with specific end-users or devices but rather is applied to all end-users and devices.

The information included in the general location table may be controlled or edited by one or more managers, and may be protected from end-user editing or editing by unauthorized managers, since the information does not indicate user-specific preferences but rather general settings. The general settings may indicate, for instance, certain "Blacklisted Areas" that are blacklisted for all users. Such areas may be generally private locations, such as courtrooms, pharmacies, a doctor's office or medical clinic, and so on. Instead of requiring every end-user or every manger to set preferences for every single one of these generally private areas, the computing device may in advance keep a log of such areas and effectively automatically blacklist storage of location information for these areas without requiring user input. For further instance, the location settings may indicate other areas that are "Commercial Areas," such as stores, restaurants, and salons. These locations may be automatically whitelisted for location gathering, meaning that for a mobile device that enters into one of these locations, location data may be stored.

In some cases, an end-user may be provided a separate setting or preference for opting out of various types of automatically whitelisted locations, or opting in to providing location data for various types of blacklisted locations. Instead of providing blanket permissions or restrictions, the setting may utilize one or more tags for associating a restriction or permission with certain types of locations, such as any location identified by the "Commercial Area" location setting. In this manner, an end-user can control location data storage control for a number of locations collectively with a single change to end-user preferences or settings. Various tags could be entered by the end-user into the end-user's specific settings to indicate one or more types of locations that should be blacklisted, whitelisted, or otherwise.

Returning to FIG. 2, the data 230 further includes a log of stored user locations 236. The log may include a list of locations received from the mobile device or another device used in tracking the location of the mobile device. Each received location entry may be associated with a specific end-user, mobile device, or both. Additionally, each received location may be timestamped.

The locations stored in the log may be geographic coordinates, such as a latitude and longitude and horizontal accuracy. In some cases, the stored coordinates may accurately describe the precise location of the mobile device and/or end-user and the time specified in the timestamp. However, in some other cases, the stored coordinates may provide only an approximate location of the mobile device and/or end-user derived from the actual coordinates of the mobile device and/or end-user. This may be accomplished by blurring the actual coordinates of the mobile device and/or end-user.

The log of stored user locations 236 may include a combination of precise locations and blurred or approximate locations. Determining whether to store a precise location or an approximate location may be determined based on the information stored in one or both of the user-specific location table 232 and the general location table 234.

The instructions 240 may include one or more routines or algorithms to be executed by the processor 210. Examples of stored routines include a location blurring routine 242 and a location storing routine 244.

The location blurring routine 242 may generally involve lowering a granularity of the location data. For instance, the determined location may be "up-leveled" to a lower level of graduality according to preset boundaries. Preset boundaries may include but are not limited to a Census Block Group (CBG) in the United States or a geohash level-6 outside of the United States, or a geographic polygon grid. In the case of either, the estimated location used to replace the actual location of the mobile device may be a centroid of the bounded area, which may or may not be a geometric center of the bounded area.

In other cases, instead of "up-leveling" the detected location of the mobile device, noise may be added to the detected location. The noise may take any form known in the relevant art, including but not limited to a probability function such as a Gaussian function, a random function, and so on. The noise may cause the actual location to shift by some randomized amount, which may be different in magnitude and direction for each stored location. One potential approach to add noise is to receive an input indicating a precise location, generate a set of candidate locations within a certain proximity to the precise location, randomly select one of the candidate locations from the generated set, and designate the selected location as the location of the mobile device and/or end-user.

The location storing routine 244 may be configured to store the received precise location or, in the case that the location blurring routine is activated, the approximate location. In those instances where an approximate location is stored, the precise location may be deleted instead of being stored. Additionally, in some cases, such as when a received location is blacklisted, neither the received location nor an approximate location is stored.

Additionally, the computing device 200 of FIG. 2 can include a collection of computing devices connected over the network 120 or over other networks not connected to the mobile devices 110a, 110b, 110c. For instance, the processors 210 of the computing device may be housed separately from the stored data 230 in the memory 220. Also, in some instances, data may be stored in separate memories, or in a common memory but partitioned separately. For further example, stored data that is considered sensitive or require additional layers of security or privacy may be stored separately from the other stored data that is not comparably sensitive or private.

In one example arrangement, the computing devices may be a centralized database remote from the mobile devices and capable of collecting, processing and storing location data from the mobile devices. The computing device may further be accessible by one or more managers, whereby instructions such as location blurring 242 and location storing 244 may be controlled by one or more managers, collected and stored location data may be accessed by the same or by different managers, or both.

In another arrangement, the computing devices may include one or more computing devices controlled by a first manager of the system configured to receive and process the mobile device locations, and one or more databases belonging to third-party clients of the system and configured to receive respective logs of processed device locations. In such an arrangement, the third-party clients may have an arrangement with the system managers to receive the end-user device location log. The system of the present disclosure provides for the log received by these third-parties to be restricted according to the end-user's and manager's preferences, as described herein.

Figure 4:
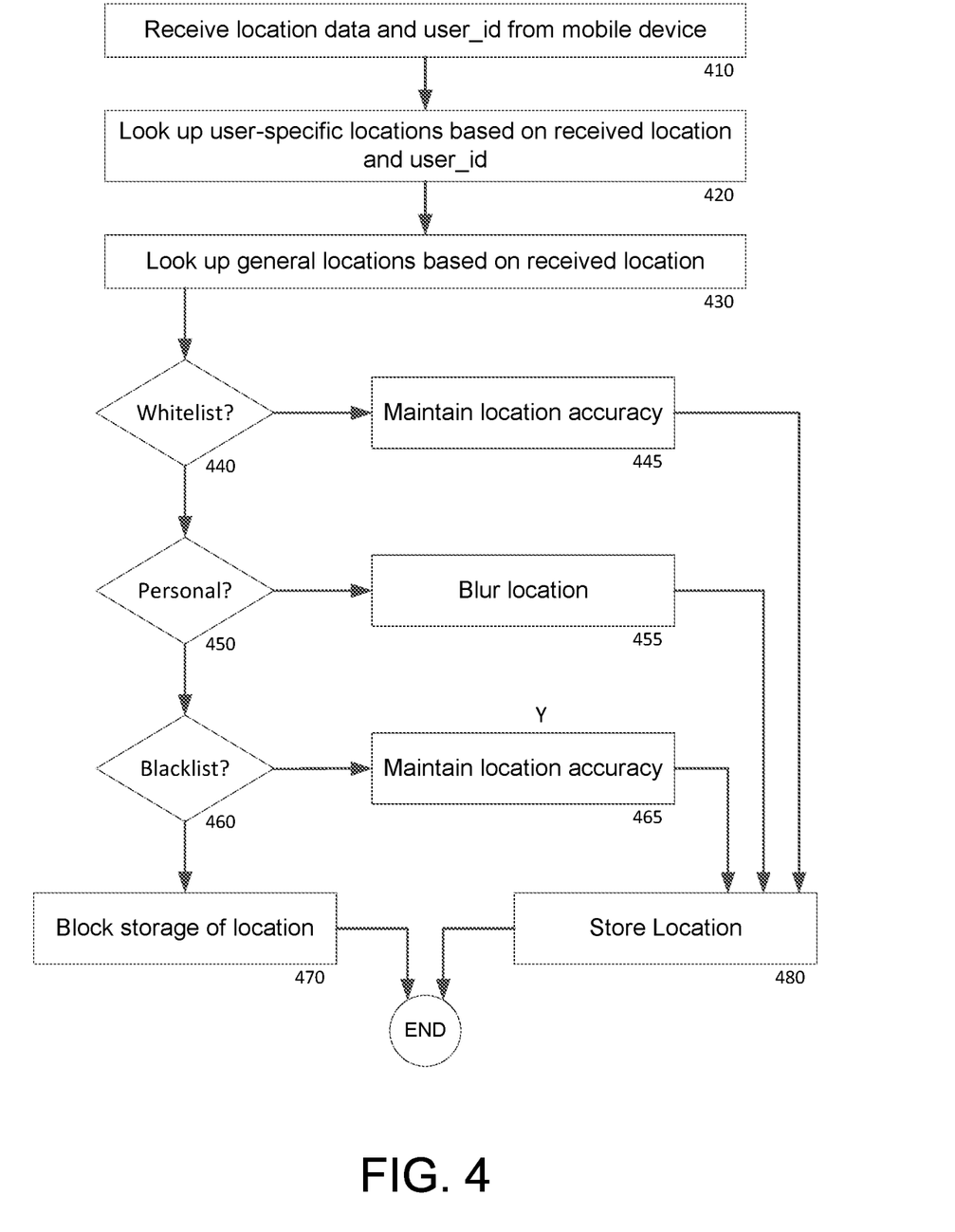
FIG. 4 is a flow diagram of an example method in accordance with an aspect of the disclosure.
Figure 5:
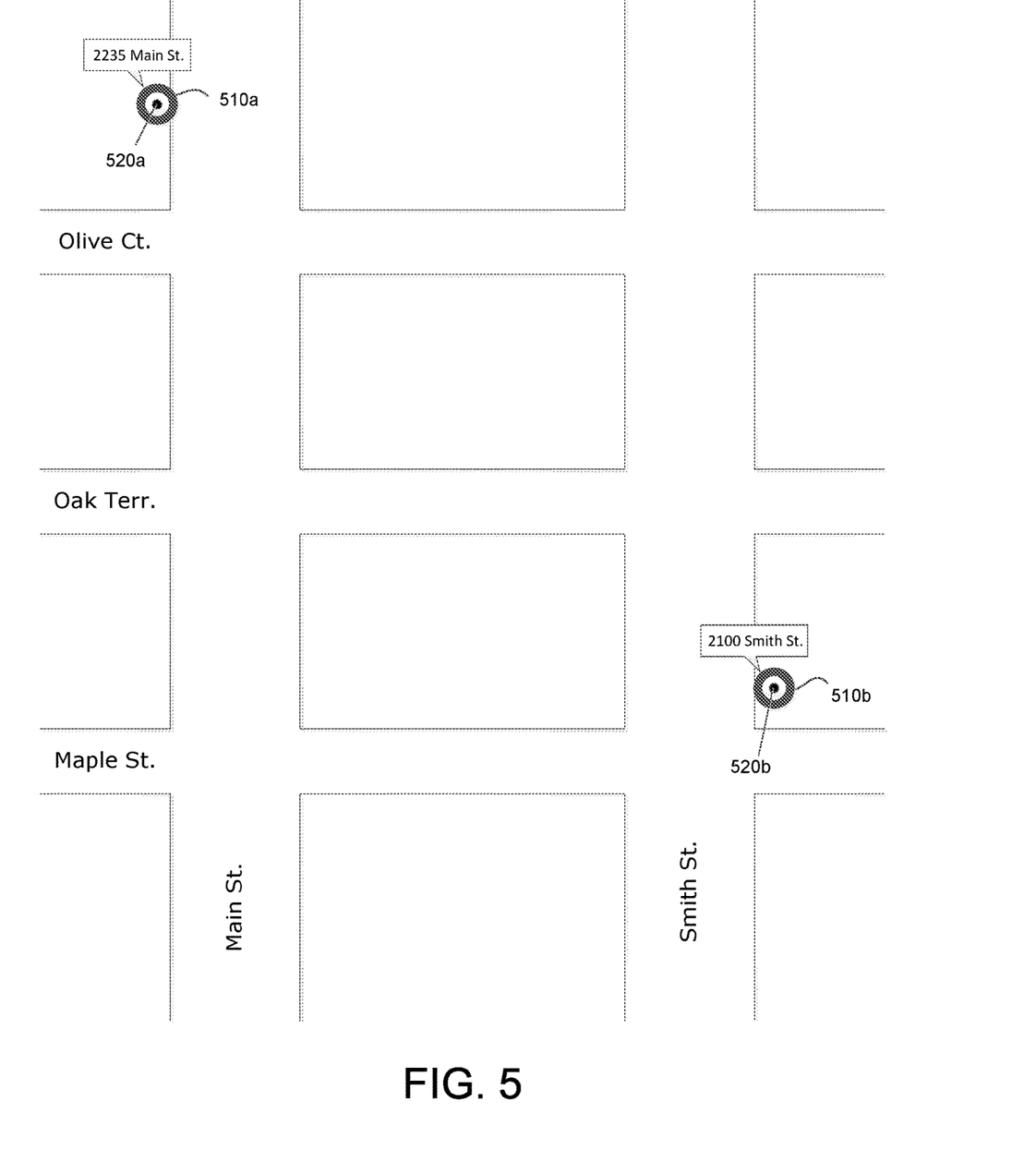
FIGS. 5-7 are diagrams illustrating operations of the example method of FIG. 4.
Figure 6:
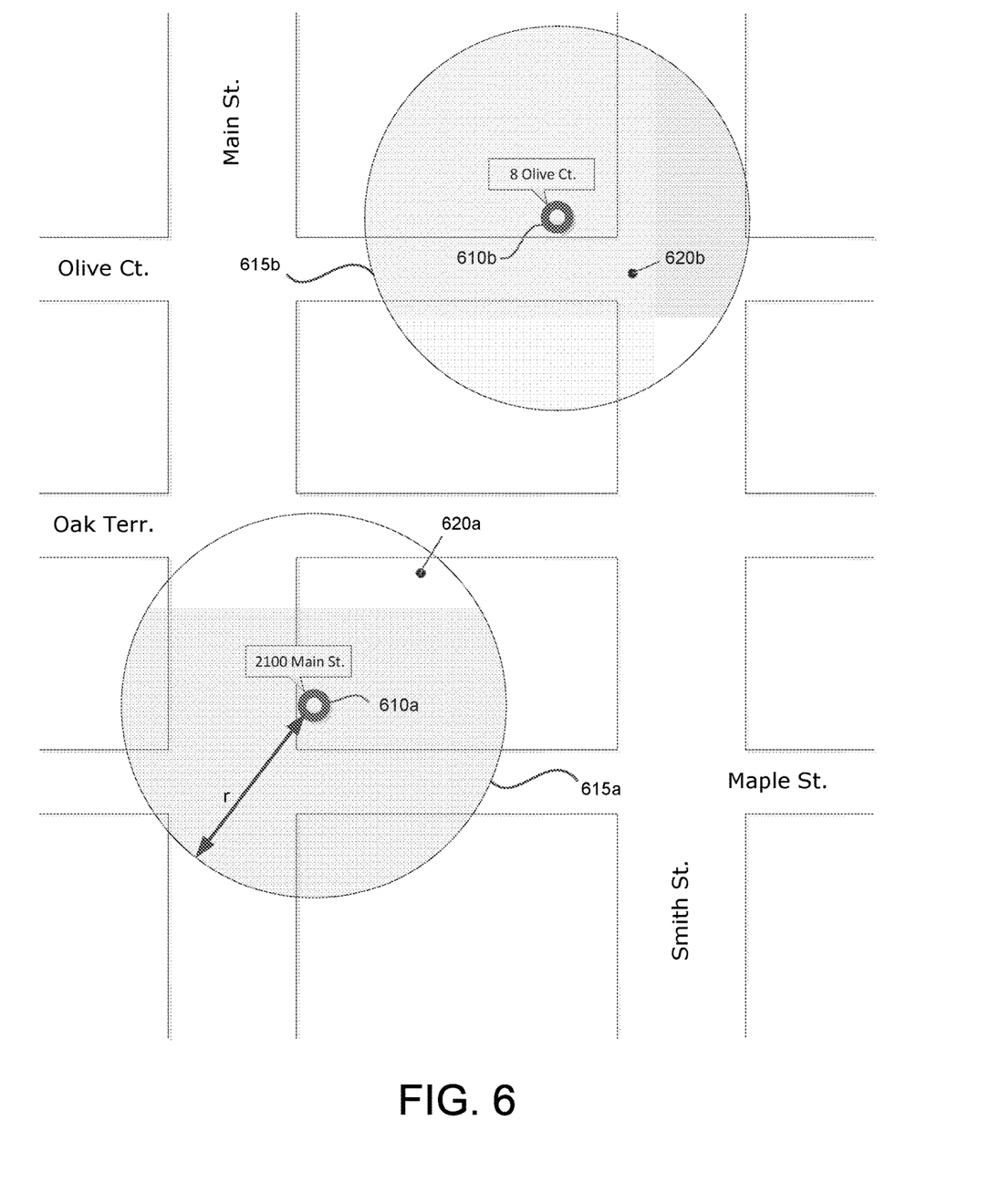
Figure 7:
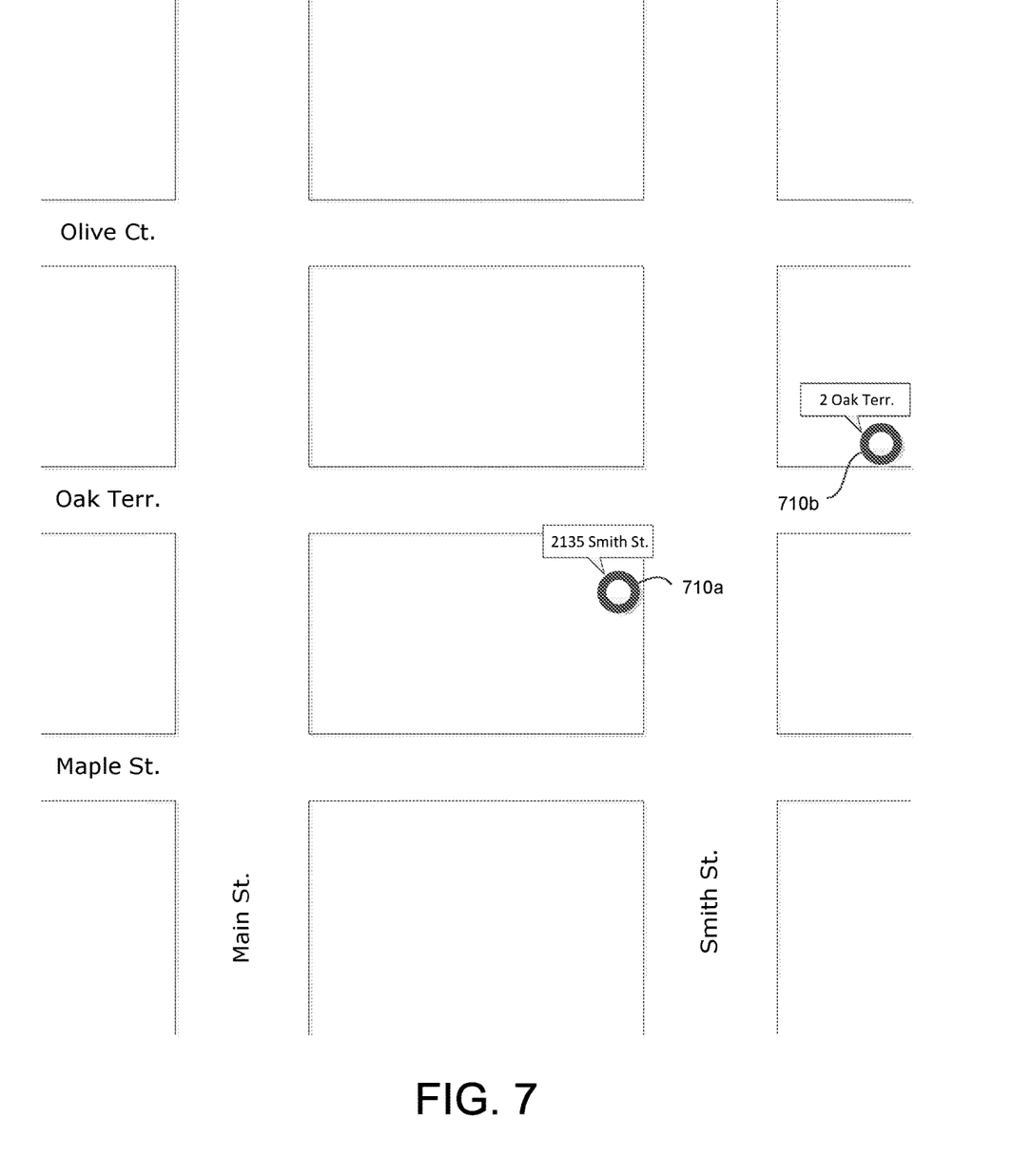

FIG. 4 includes is a flow diagram 400 of an example location blurring routine. It should be understood that the steps of the routine 400 are provided by way of example, and that certain steps may be replaced or omitted, performed concurrently or simultaneously, or performed in a different order. In other routines, other steps may be added. FIGS. 5, 6 and 7 are geographic maps that illustrate example applications of certain aspects of the routine 400 of FIG. 4 and, therefore, are described herein in connection with the steps of FIG. 4.

At block 410 of the routine, one or more processors of the computing device receive location data indicating the location of a mobile device. The received data may further include an end-user identification (user_id) associated with the mobile device at the received location, or with an end-user of the mobile device at the received location.

At block 420, the received location and user_id are utilized in order to look up user-specific location settings. For instance, the one or more processors of the computing device may access a user-specific location table like shown in FIG. 2. A table entry including a location matching the received location and end-user matching the user_id may be searched for. If such an entry is found, operations may continue at block 440. Otherwise, operations may continue at block 430.

At block 430, the received location is utilized in order to look up generalized location settings. For instance, the one or more processors of the computing device may access a general location table like shown in FIG. 2. A table entry including a location matching the received location may be searched for. In some instances, block 430 may be conducted before block 420, whereby if the search returns an one or more entries, operations may continue at block 440, otherwise operations would continue at block 420.

At block 440, the one or more processors determine whether a location status listed in a matching entry from the search is a "Whitelist" status. If the status is "Whitelist,"

then operations may continue at block 445, in which the received location is maintained without being blocked or blurred, after which operations may continue at block 480. Otherwise, if the status is not "Whitelist," operations may continue at block 450.

FIG. 5 illustrates some examples of the "Whitelist" operation. In FIG. 5, a mobile device 510*a* identified as "User 1" is determined to be located at 2235 Main St., and a mobile device 510*b* identified as User 2 is determined to be located at 2100 Smith Street. For "User 1," the address 2235 Main St. is listed in the user-specific location data table as a "Whitelisted Area." Therefore, location 520*a* is stored, resulting in the accuracy of the location of mobile device 510*a* being maintained during storage and not being blurred. For "User 2," the address 2100 Smith St. is listed in the general location data table as a "Commercial Area," which may be a type of whitelisted area. Therefore, location 520*b* is stored, resulting in the accuracy of the location of mobile device 510*b* also being maintained during storage and not being blurred.

At block 450, the one or more processors determine whether a location status listed in a matching entry from the search is a "Personal" status. If the status is "Personal," then operations may continue at block 455, in which the received location is blurred, after which operations may continue at block 480. Otherwise, if the status is not "Personal," operations may continue at block 460.

FIG. 6 illustrates some examples of the "Personal" operation. In FIG. 6, a mobile device 610*a* of User 1 is determined to be located at 2100 Main St., and a mobile device 610*b* of User 2 is determined to be located at 8 Olive Court. For "User 1," the address 2100 Main St. is listed in the user-specific location data table as a "Personal Area," the user's workplace in particular. Therefore, the accuracy of the location of mobile device 610*a* is blurred by generating an area 615*a* around the location of mobile device 610*a* having radius "r" and randomly selecting a location from within the generated area 615*a*. In the example of FIG. 6, approximate location 620*a* is selected and stored in the computing device, thus blurring the actual location of mobile device 610*a*. For "User 2," the address 8 Olive Ct. is listed in the general location data table as a "Personal Area," the user's home in particular. Therefore, the accuracy of the location of mobile device 610*b* is blurred by generating an area 615*b* around the location of mobile device 610*b* having radius "r" and randomly selecting a location from within the generated area 615*b*. In the example of FIG. 6, approximate location 620*b* is selected and stored in the computing device, thus blurring the actual location of mobile device 610*b*.

In the example of FIG. 6, the actual location is shown to be blurred when it is at the Personal Area location. However, in other examples, an actual location of a mobile device may be blurred whenever the mobile device is within a predetermined radius of the Personal Area. The predetermined radius may be the same or different than the radius "r" used to generate the blurring areas 615*a*, 615*b*. For instance, the predetermined radius may be relatively small (e.g., 5 meters, 10 meters, 20 meters, etc.) in order to avoid excessively blurring location data, and the radius "r" of the generated area 615*a*, 615*b* may be comparatively large (e.g., 100 meters, 200 meters, etc.) in order to maintain secrecy of the device's actual location when it is in the personal area.

At block 460, the one or more processors determine whether a location status listed in a matching entry from the search is a "Blacklist" status. If the status is not "Blacklist," then operations may continue at block 465, in which the received location is maintained without being blocked or blurred, after which operations may continue at block 480. Otherwise, if the status is "Blacklist," operations may continue at block 470, whereby stored of the received location is blocked due to the sensitive or private nature of the mobile device's whereabouts.

FIG. 7 illustrates some examples of the "Blacklist" operation. In FIG. 7, a mobile device 710*a* of "User 1" is determined to be located at 2135 Smith St., and a mobile device 710*b* of User 2 is determined to be located at 2 Oak Terrace. For "User 1," the address 2135 Main St. is listed in the user-specific location data table as a "Blacklisted Area." Therefore, no location of the mobile device 710*a* is stored, resulting in the location of mobile device 710*a* being masked. For "User 2," the address 8 Oak Terr. is listed in the general location data table as a "Blacklisted Area," particularly a dental clinic. Therefore, no location of the mobile device 710*b* is stored, resulting in the location of mobile device 710*b* also being masked. Masking the location may involve not storing any data. Alternatively, masking the location may involve storing a null entry, such as coordinates of (0,0) into the log.

At block 480, the one or more processors may store the location in the memory of the computing device, such as in a user location log like shown in FIG. 2. Some locations may be blurred, such as if they are personal locations blurred during the operation of block 455, while the accuracy of other locations may be maintained, such as if the locations are whitelisted.

In some situations, there may be conflicting location statuses between user-specific location data and general location data. A routine may be configured to resolve such a conflict. In the example of FIG. 4, routine 400 is designed in order to override a "Blacklist" setting if there is conflicting "Whitelist" or "Personal" setting. For instance, if a location is marked with a "Blacklist" status in the general location data but marked with a "Whitelist" or "Personal" status in the user-specific location data, the routine 440 will store the accurate location according to the "Whitelist" decision block 440 or the blurred location according to the "Personal" decision block 450, without conducting operations according to the "Blacklist" decision block 460. In other example configurations of the routine, the routine may be configured to resolve conflicts differently. For instance, "Blacklist" operations may be performed before "Whitelist operations," making it possible for any "Blacklist" setting to override a conflicting "Whitelist" setting. Additionally, or alternatively, the routine may allow end-user preference data to override general data or vice versa. Additionally, or alternatively, the routine may include an element of randomness in the determination, whereby a "Whitelist" setting can override a "Blacklist setting" on some occasions and vice versa on other occasions. This can be configured by first determining a randon value, and than determining an action to be taken with the determined location of the mobile device based on the value of the random value.

The example of FIG. 4 shows only three types of location status. However, it should be understood that additional types of location status may be analyzed and may include their own respective operations. For example, a location status may include multiple levels of privacy, whereby a first level of privacy may indicate a first degree of blurring, and a second level of privacy may indicate a second degree of blurring, and so on. Different degrees of blurring may be achieved by adjusting the radius or range of geographical locations around the actual or accurate location of the mobile device from which the estimated or blurred location is selected.

Different amounts of blurring may also be warranted depending on the density of a particular region. In other words, the location of a mobile device is a densely populated region may be blurred with even a small change in location. For instance, in a city having densely packed buildings, even a small change in location, such as 20 meters or 40 meters or 60 meters may be sufficient to blur the location of a mobile device. Conversely, the location of a mobile device in a more sparsely populated region may not be adequately blurred unless there is a large change in location. For instance, in a rural setting having few houses, even a large change in location, such as 100 meters or 150 meters or 200 meters may not be sufficient to blur the location of the mobile device. Therefore, the one or more processors may further be configured to determine whether a detected location of the mobile is densely or sparsely populated and set the radius "r" for blurring accordingly.

Figure 8:
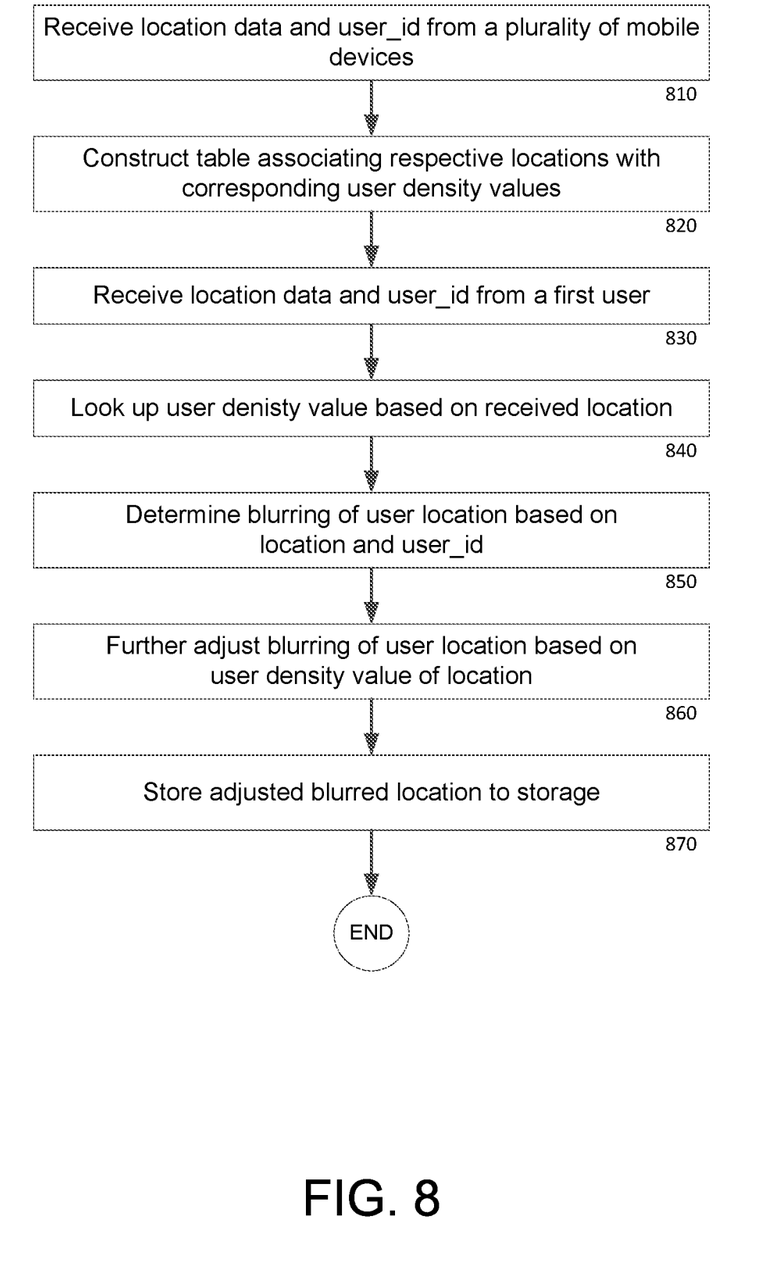
FIG. 8 is a flow diagram of another example method in accordance with an aspect of the disclosure.

FIG. 8 is a flow diagram illustrating an example population density based blurring routine 800. Operations begin at block 810, in which location data and user_id information is received by the one or more processors from a plurality of mobile devices over time. The various location data and user_id data may be stored in the memory of the computing device in accordance with the routine 400 of FIG. 4, meaning that personal or private location data may be blurred or even masked. Over time, the accumulated location data and user_id information can be used to analyze how many unique user_ids pass through a particular location or region.

At block 820, the one or more processors construct a table associating respective locations with corresponding user density values. For instance, a location stored in the computing device and associated with only a few different user_id identifications may be indicative of a relatively low user density, and a low user density value may be assigned. Conversely, a location stored in the computing device and associated with many different user_id identifications may be indicative of a relatively high user density, and a high user density value may be assigned. Adjacent locations within a predefined distance may be considered when determining the density of a given location. Alternatively, several locations within a relatively wider region may be collectively assigned a single density value.

At block 830, after a location density table has been constructed according to the operations of block 820, the one or more processors receive location data and a user_id from a first end-user. This operation is comparable to the operation at block 410 in FIG. 4. At block 840, the user density value associated with the location indicated by the received location data is looked up in the construct location density table. The density value may dictate the range of candidate locations that may be selected from in order to replace the actual location.

At block 850, it is determined whether to blur the device location based on the received location and the user_id. This operation may be comparable to the operation at block 450 in FIG. 4, which a "Personal" setting associated with the location is checked for the end-user indicated by the user_id. Alternatively, the blurring determining may be based on other settings, including general settings. At block 860, in the event that the location should be blurred based on the user-specific location settings or the general location settings, the amount of blurring performed may be adjusted or otherwise controlled based on the user density value associated with the determined actual location of the mobile device. For instance, a low user density value may indicate low density population at the actual location of the mobile device and may correspond to a high level of blurring, whereas a high user density value may indicate a high population density at the actual location of the mobile device and may correspond to a low level of blurring. Either one or both of the user density value and the blurring value (e.g., a radius) may be selected from a list of discrete values, such as values in a correspondence table, or may be a non-discrete value such as a value calculated according to a formula for which the user density value is an input, and the blurring value is an output.

At block 870, an estimated location of the mobile device is blurred according to the blurring value, and the estimated location is stored at the computing device. This operation is largely comparable to blocks 455 and 480 of FIG. 4, except that the radius "r" is a variable radius defined at least in part according to the user density value. In the case of using "up-leveling" to control the blurring, the CBG, geohash level or geographic polygon grid may be chosen according to the user density value. Alternatively, the CBG, geohash level or geographic polygon grid may remain constant, and then noise may be added in order to further approximate the location of the mobile device. In the case of randomly selecting a location from within a range, the span of range may be defined according to the user density value, whereby higher densities may require narrower ranges and lower densities may require wider ranges. As with the routine of FIG. 4, the original and actual location of the mobile device may be deleted instead of being stored.

Alternatively, the routine 800 of FIG. 8 may begin with receiving a table of user density information, instead of constructing the table. For instance, the table may be constructed by a third party, such as one or more of the third-parties having access to the location data stored in the log. The tables constructed by the one or more third-parties can then be provided to the one or more processors for storage and/or processing and operations may continue from block 830.

The above examples and embodiments generally describe identifying an actual location of a mobile device and determining a level of specificity or accuracy for storing the location. It should be understood that the actual location is not limited to a precise location, but rather itself may be imprecise, such as a location based on GPS measurements. Furthermore, it may be desirable for user's locations to be protected not only when they are in a private or personal area, but also when they are close to the private or personal area. As such, the actual location may actually be a range of locations, such as any location within a few meters or even tens of meters from a detected location of the mobile device. Furthermore, locations stored in the location computing device may be defined by more than a single point but rather by a group of boundaries, whereby any overlap between the actual location (or a portion of the actual location) and the bounded area of a stored location may trigger application of a location setting. Boundaries may be defined as a polygon according to geographical coordinates (e.g., each vertex of the polygon associated with another geographical coordinate). The use of boundaries may be applied to any one or more of Whitelisted, Blacklisted or Personal areas, and so on.

The location blurring techniques described herein may be configured to meet data privacy regulations, such as a local, national or international data privacy regulation or guideline, including but not limited to the European Union's General Data Protection Regulation (GDPR) and the California Consumer Privacy Act of 2018 (CCPA)

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
   receiving, by one or more processors, location data indicating a location of a mobile device and a user identification associated with the mobile device;
   accessing, by the one or more processors, prestored data associated with the user identification, wherein the prestored data includes a first geographic location associated with a first degree of blurring and a second geographic location not associated with the first degree of blurring;
   in response to the location of the mobile device corresponding to the first geographic location, generating, by the one or more processors, a first derived location of the mobile device based on the first degree of blurring; and
   storing, by the one or more processors, the first derived location of the mobile device in a mobile device location log associated with the user identification,
   wherein generating the first derived location comprises:
      generating a set of candidate first modified locations, each candidate modified location corresponding to a shift in the location indicated in the received location data by a different amount, a different direction or both, and bound by a predetermined boundary that contains the location indicated in the received location data;
      randomly selecting one of the candidate first modified locations from the generated set; and
      designating the selected location as the first derived location,
      wherein the predetermined boundary is defined by one of a Census Block Group (CBG), a geohash level, or a geographic set of polygons.

2. The method of claim 1, wherein the second geographic location is associated with a second degree of blurring that is different from the first degree of blurring, and the method further comprises:
   in response to the location of the mobile device corresponding to the second geographic location, generating, by the one or more processors, a second derived location of the mobile device based on the second degree of blurring.

3. The method of claim 1, wherein the prestored data includes general prestored data, wherein each geographic location of the general prestored data is associated with all mobile devices.

4. The method of claim 3, wherein the prestored data further comprises user-specific prestored data, wherein each entry of the user-specific prestored data further comprises a stored user identification associated with the stored location and a corresponding location status selected from a plurality of candidate location statuses, wherein one candidate location status is associated with the first degree of blurring and another candidate location status is associated with no blurring.

5. The method of claim 4, wherein the first degree of blurring is associated with a personal location status indicating that the first geographic location is a personal location.

6. The method of claim 4, wherein another candidate location status is a blacklist status, and wherein the prestored data includes a third geographic location associated with the blacklist status, the method further comprising, in response to the location of the mobile device corresponding to the third geographic location, masking, by the one or more processors, the location of the mobile device.

7. The method of claim 6, wherein masking the location of the mobile device comprises not storing the location of a mobile device in the mobile device location log.

8. The method of claim 6, wherein masking the location of the mobile device comprises generating, by the one or more processors, a null location entry, and storing the null location entry in the mobile device location log as the location of the mobile device.

9. The method of claim 4 wherein the candidate location status associated with no blurring is a whitelist location status indicating to store the received location data in the mobile device location log without blurring.

10. The method of claim 1, whereinfor each candidate modified location, generating the candidate modified location comprises adding noise to the location of the mobile device indicated in the location data, wherein the noise displaces the location by up to threshold distance.

11. The method of claim 10, wherein the threshold distance is about 100 meters.

12. The method of claim 1, wherein the derived location is compliant with at least one of the General Data Protection Rules (GDPR) or the California Consumer Privacy Act (CCPA).

13. A system comprising:
   one or more processors; and
   a memory storing:
      prestored data associated with the user identification, wherein the prestored data includes a first geographic location associated with a first degree of blurring and a second geographic location not associated with the first degree of blurring; and
      instructions programmed to cause the one or more processors to:
         receive location data indicating a location of a mobile device and a user identification associated with the mobile device;
         in response to the location of the mobile device corresponding to the first geographic location, generate a first derived location of the mobile device based on the first degree of blurring; and store the first derived location of the mobile device in a mobile device location log associated with the user identification, wherein the one or more processors generate the first derived location by:

generating a set of candidate first modified locations, each candidate modified location corresponding to a shift in the location indicated in the received location data by a different amount, a different direction or both, and bound by a predetermined boundary that contains the location indicated in the received location data;

randomly selecting one of the candidate first modified locations from the generated set; and designating the selected location as the first derived location, wherein the predetermined boundary is defined by one of a Census Block Group (CBG), a geohash level, or a geographic set of polygons.

14. The system of claim 13, wherein the memory further comprises the mobile device location log associated with the received user identification.

15. The method of claim 1, wherein the predetermined boundary is a perimeter around the location indicated in the received location data having a predetermined radius.

16. The method of claim 1, wherein entries stored in the prestored data is updatable, and wherein locations stored in the mobile device location log are not updatable.

* * * * *